United States Patent [19]
Sun et al.

[11] Patent Number: 5,442,400
[45] Date of Patent: Aug. 15, 1995

[54] ERROR CONCEALMENT APPARATUS FOR MPEG-LIKE VIDEO DATA

[75] Inventors: Huifang Sun, Princeton; Joel W. Zdepski, Belle Mead; Kamil M. Uz, Plainsboro, all of N.J.

[73] Assignee: RCA Thomson Licensing Corporation, Princeton, N.J.

[21] Appl. No.: 53,760

[22] Filed: Apr. 29, 1993

[51] Int. Cl.$^6$ .......................... H04N 7/64; H04N 7/66
[52] U.S. Cl. ............................. 348/402; 348/409; 348/413; 348/416
[58] Field of Search ............... 348/384, 390, 400, 401, 348/402, 409, 412, 413, 415, 416, 607, 624; H04N 7/64, 7/66, 7/68

[56] References Cited

U.S. PATENT DOCUMENTS

| | | | |
|---|---|---|---|
| 4,807,033 | 2/1989 | Keesen et al. | 358/167 |
| 5,148,272 | 9/1992 | Acampora et al. | 348/390 |
| 5,150,432 | 9/1992 | Ueno et al. | 348/438 |
| 5,212,549 | 5/1993 | Ng et al. | 348/409 |
| 5,237,410 | 8/1993 | Inoue | 348/409 |
| 5,243,428 | 9/1993 | Challapali et al. | 348/603 |
| 5,247,363 | 9/1993 | Sun et al. | 348/607 |
| 5,260,783 | 11/1993 | Dixit | 348/415 |
| 5,339,321 | 8/1994 | Paek | 348/624 |

FOREIGN PATENT DOCUMENTS

| | | | |
|---|---|---|---|
| WO87/02210 | 4/1987 | European Pat. Off. | H04N 7/13 |
| WO92/1433-98 | 8/1992 | European Pat. Off. | H04N 7/13 |
| 2219463 | 6/1989 | United Kingdom | H04N 5/262 |

OTHER PUBLICATIONS

Stafano Tubaro, "A two layers video coding scheme for ATM networks", 8376 Signal Processing Image Communication, 3(1991) Jun., Nos. 2/3, Amsterdam, NE pp. 129-141.

G. Morrison et al, "Two-layer video coding for ATM networks" 8376 Signal Processing Image Communication, 3(1991) Jun., Nos. 2/3, Amsterdam, NE pp. 179-195.

M. Ghanbari, "A motion vector replenishment video codec for ATM networks", 8376 Signal Processing Image Communication, 3(1991) Jun., Nos. 2/3, Amsterdam, NE pp. 143-156.

G Karlsson et al, "Packet Video and Its Integration into the Network Architecture" 8272 IEEE Journal on Selected Areas in Communications, 7(1989)Jun., No. 5, New York, US pp. 739-751.

H. Tominaga et al., "A video coding method considering cell losses in ATM-based networks", 8376 Signal Processing Image Communication, 3(1991) Sep., Nos. 4, Amsterdam, NE pp. 291-300.

(List continued on next page.)

*Primary Examiner*—Tommy P. Chin
*Assistant Examiner*—Vu Le
*Attorney, Agent, or Firm*—Joseph S. Tripoli; Eric P. Herrmann; Ronald H. Kurdyla

[57] ABSTRACT

A video signal compression system includes motion compensated predictive compression apparatus for compressing respective frames of video signal according to either intraframe processing or interframe processing on a block by block basis to generate blocks of compressed data and associated motion vectors. A compressed signal formatter arranges the blocks of compressed data and the associated motion vectors according to a desired signal protocol wherein motion vectors of interframe processed frames are associated with corresponding blocks of compressed data and motion vectors of intraframe processed frames are associated with blocks substantially adjacent to corresponding blocks of compressed data. The motion vectors are included with intraframe compressed data to facilitate error concealment at respective receiver apparatus.

6 Claims, 4 Drawing Sheets

OTHER PUBLICATIONS

K. C. Chua et al., "Error detection and correction of vector quantised digital images", 8049i Iee Proceedings-1, 137(1990)Dec., No. 6, Part I, Stevenage, Herts., GB, pp. 417–423.

Shaw-Min Lei et al, "An Entropy Coding System for Digital HDTV Applications," IEEE Transactions on Circuits and Systems for Video Technology, vol. 1, Mar. 1991. pp. 147–155.

R. K. Jurgen "The Challenges of Digital HDTV," IEEE Spectrum Apr. 1991, pp. 28–30, 71–73.

International Organization for Standardization, ISO-IEC JTC1/SC29/WG11, Document, AVC-445, "Coded Representation of Picture and Audio Information" Test Model 4, MPEG93/93/225, Jan. 1993.

G. Aartsen, et al "Error resilience of a video codec for low bit rates" International Conference on Acoustics, Speech, and Signal Processing, vol. II, Multidimensional Signal Processing, Apr. 1988, New York CIty, pp. 1312–1315.

ERROR CONCEALMENT APPARATUS FOR MPEG-LIKE VIDEO DATA

This invention relates to apparatus for providing concealment of lost or corrupted video data in compression systems using an MPEG-like signal protocol.

BACKGROUND OF THE INVENTION

When referring to MPEG-like signal what is meant is a compressed video signal of the general hierarchical form established by the MPEG Video Committee for International Organization for Standardization.

MPEG-like video compression cyclically provides fields/frames of data compressed by either intraframe techniques or interframe predictive techniques. Refer to FIG. 1 which shows a pictorial representation of the MPEG-like coding format. The frame sequence is merely representative. The letters I, P, and B above respective frames indicate the coding mode for the respective frame. The frame sequence is divided into groups of frames (GOF) each of which includes the same coding sequence. Each frame of coded data is divided into slices representing, for example, 16 image lines. Each slice is divided into macroblocks each of which represents, for example, a 16×16 matrix of pixels. Each macroblock consists of, for example, 6 blocks including four blocks of information relating to luminanee signal and two blocks of information relating to chrominance signal. The luminance and chrominance information are coded separately and then combined for transmission. The luminanee blocks include data relating to respective 8×8 matrices of pixels. Each chrominance block comprises an 8×8 matrix of data relating to the entire 16×16 matrix of pixels represented by the macroblock.

Blocks of data, encoded according to intraframe coding (I frames), consist of matrices of Discrete Cosine Coefficients. That is, respective 8×8 blocks of pixels are subjected to a Discrete Cosine Transform (DCT) to provide coded signal. The coefficients are subjected to adaptive quantization, and then are run-length and variable-length encoded. Hence respective blocks of transmitted data may include fewer than an 8×8 matrix of codewords. Macroblocks of intraframe encoded data, will include, in addition to the DCT coefficients, information such as the level of quantization employed, a macroblock address or location indicator, and a macroblock type.

Blocks of data encoded according to P or B interframe coding also consist of matrices of Discrete Cosine Coefficients. In this instance however the coefficients represent residues or differences between a predicted 8×8 pixel matrix and the actual 8×8 pixel matrix. These coefficients are subjected to quantization and run- and variable-length coding. In the frame sequence I and P frames are designated anchor frames. Each P frame is predicted from the lastmost occurring anchor frame. Each B frame is predicted from one or both of the anchor frames between which it is disposed. The predictive coding process involves generating displacement vectors which indicate which block of an anchor frame most closely matches the block of the predicted frame currently being coded. The pixel data of the matched block in the anchor frame is subtracted, on a pixel-by-pixel basis, from the block of the frame being encoded, to develop the residues. The transformed residues and the vectors comprise the coded data for the predictive frames. As with intraframe coded frames the macroblocks include quantization, address and type information.

SUN and ZEDEPSKI in U.S. patent application Ser. No. 08/017,455 filed Feb. 12, 1993 and entitled APPARATUS FOR CONCEALING ERRORS IN A DIGITAL VIDEO PROCESSING SYSTEM (incorporated in its entirety herein by reference) describe a method of concealing errors in video data which was compressed in MPEG-like format. In this system the MPEG-like signal is arranged in transport packets for transmission. The transport packets include error codes for detecting loss or corruption of respective packets. Sun and Zdepski describe processes for concealing the effects of the lost transport packets on reproduced images. These processes include providing substitute compressed data and or providing substitute decompressed data dependent upon the type of compressed data lost or corrupted. Error concealment techniques set forth by Sun and Zdepski, include the substitution collocated blocks of decompressed data, substitution of non-collocated blocks of decompressed data derived from motion vectors from vertically adjacent macroblocks and the use of motion vectors from vertically adjacent macroblocks in forming substitute compressed data for a lost macroblock of interframe compressed data.

Intraframe compressed data tends to be of greater importance than the interframe compressed data in reproducing compressed images because all frames in a group of frames depend from or build on the decompressed intraframe data. Ironically error concealment of intraframes is least effective because there is less variety of encoded data from which to select substitute data. In particular, there are no motion vectors included within the intraframe coded information. As a result, substitute blocks of interframe data are substantially relegated to being either an average gray value or collocated blocks from a prior frame or interpolated blocks. If the blocks are collocated, moving image objects will create image artifacts. alternatively if the substitute blocks are interpolated, these areas will suffer loss of detail.

SUMMARY OF THE INVENTION

The present invention is an MPEG-like compression system including apparatus for compressing respective frames according to intraframe and interframe compression processes. Interframe compression apparatus is utilized to generate motion vectors for intraframe compressed frames. The intraframe compressed data is arranged in blocks or macroblocks and the intraframe motion vectors associated with respective blocks or macroblocks are included in the coded signal of vertically adjacent blocks or macroblocks for transmission.

At the receiving end of such system, respective motion vectors contained in the coded blocks or macroblocks of the intraframe compressed data are extracted and stored. When blocks or macroblocks associated with such motion vectors are subsequently received or should have been received and have been determined to be lost or corrupted and uncorrectable, the associated motion vectors are accessed from storage and utilized to generate substitute data for the lost or corrupted blocks or macroblocks.

DETAILED DESCRIPTION

Figure 2:
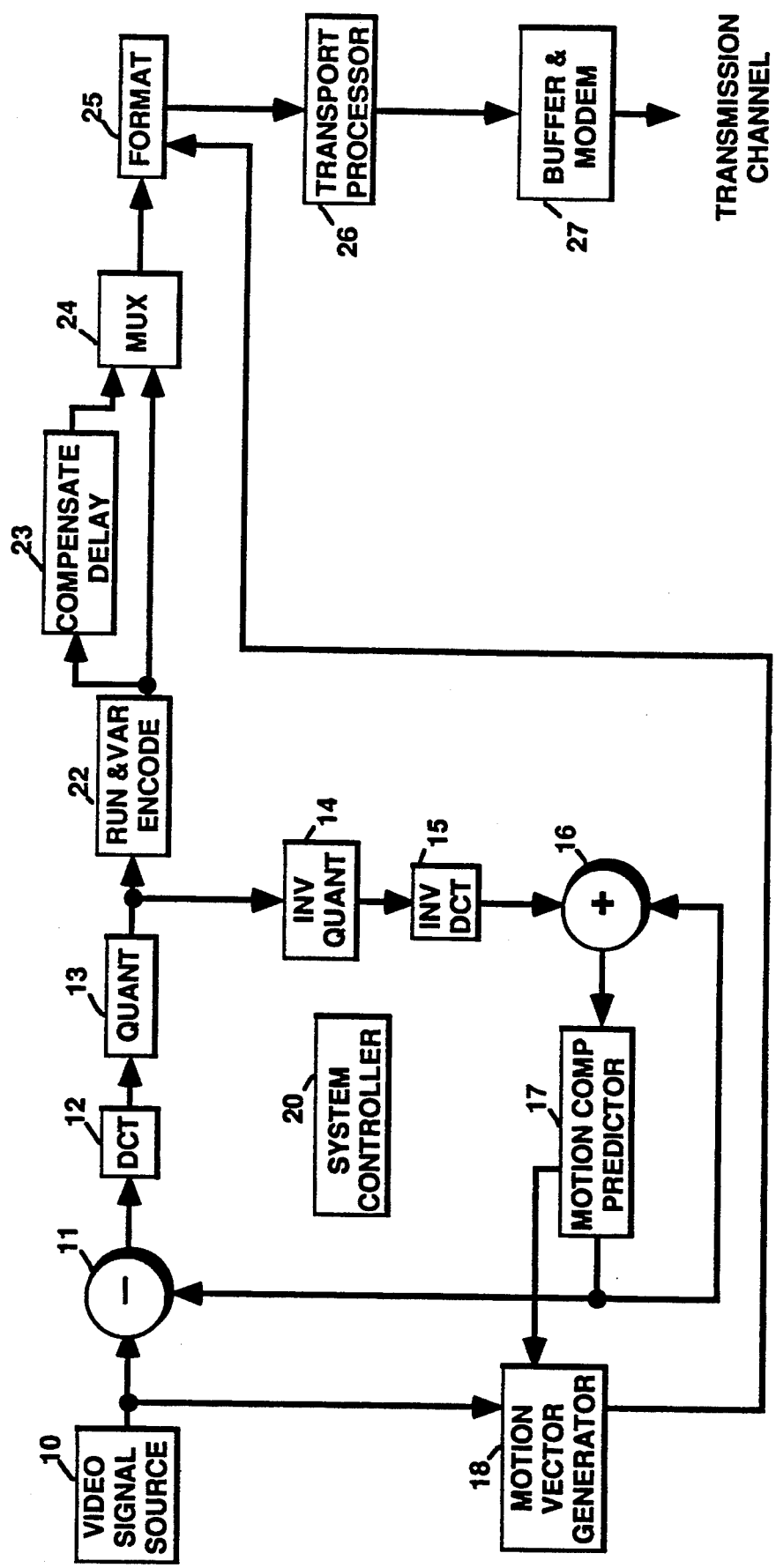
FIG. 2 is a block diagram of apparatus for compressing video signal to provide a compressed video signal according to an MPEG-like protocol.

Apparatus for generating MPEG-like signal is shown in FIG. 2. MPEG-like processing apparatus nominally includes separate apparatus (at least in part) for compressing luminance and chrominance signal components. The luminance component compression apparatus is shown in the figure. However it is assumed that the formatter 25 receives compressed chrominance data, from parallel circuitry not shown, in order to create macroblocks of both luminance and chrominance compressed data. Since this type of apparatus is generally known to those skilled in the art of video signal compression, only a brief description will be provided.

In FIG. 2, a video signal source 10 provides video signal to be compressed to one input of a subtraction circuit 11, and to a motion vector generator 18. Signal from a motion compensated predictor including elements 17 and 16, is applied to a second input of the subtraction circuit. During intraframe compression The predictor provides a zero value to the subtraction circuit 11, and during interframe compression the predictor provides values representing a prediction of the current frame being compressed. Hence during intraframe compression the subtraction circuit 11 provides pixel values, and during interframe compression it provides the differences between the pixel values of the current frame and the predicted frame, i.e., it provides residues.

The values provided by the subtraction circuit 11 are provided to a discrete cosine transform, DCT, circuit 12, which transforms the spatial domain signal to the frequency domain. Coefficients generated by the DCT are quantized in a quantizing apparatus 13 which effectively limits the dynamic range of respective ones of the coefficients. The quantized coefficients are then run length and variable length encoded in the element 22. The signal is thereafter applied to a formatter 24, which arranges the signal components according to the desired signal protocol e.g., the MPEG-like protocol. Note provision may be included to DPCM encode certain of the signal components such as the DC DCT coefficients and/or motion vectors. The MPEG-like signal is applied to a transport processor wherein it is conditioned for transmission over non-noise free channels. The conditioned signal is coupled to a modem 27, or a storage medium (not shown) for transmission or storage.

Signal from the quantizer 13 is applied to the serial combination of an inverse quantizer 14 and an inverse DCT 15, which respectively perform the inverse functions of elements 13 and 12. The pixel values or residues generated by the inverse DCT are applied to the motion compensated predictor which develops a reconstruction of, or a prediction of, the current frame.

The motion vector generator 18 receives predicted frame data from the predictor 16, 17, and current frame data from the source 10, and generates vectors which identify blocks of the predicted frame which are the best match to blocks in the current frame. These motion vectors are applied to the formatter 25 wherein they are associated with their corresponding macroblocks in the MPEG-like code sequence. That is, each interframe coded macroblock of residue transform coefficients has a motion vector associated therewith to indicate to decoding apparatus the raster location which the decoded macroblock values should represent. In the MPEG-like systems, as noted before, motion vectors are only generated for interframe compressed frames of video signal, and the motion vector generator 18 need not operate during intraframe compression.

Figure 1:
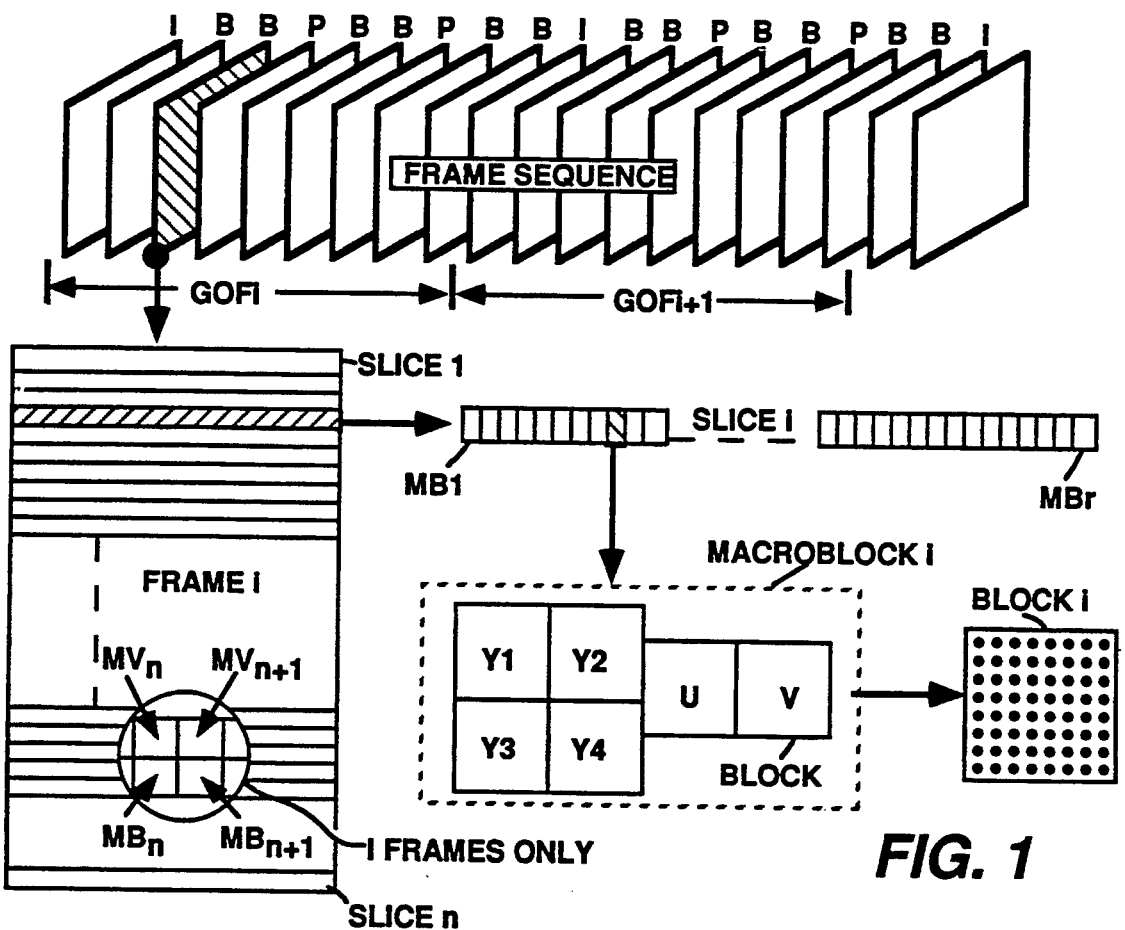
FIG. 1 is a pictorial representation of signal layers of an MPEG-like compressed video signal

In the present system however, the motion vector generator is operated during intraframe compression to generate motion vectors for respective macroblocks of I frames to aid in error concealment processes at respective receivers. The motion vector generator may operate for I frames in the same manner it operates for P frames for example. The motion vectors generated for macroblocks of such I frames indicate macroblocks in a prior decoded anchor frame, stored for example in memory of the motion compensated predictor, which most closely matches each respective macroblock. However in this application of the motion vectors, the motion vectors are not coded within the macroblocks for which they were generated. Rather they are included within macroblocks which have a low probability of being lost or corrupted if the macroblock which it represents is lost or corrupted. Assume that horizontally adjacent macroblocks are included in the same transport packets, but vertically adjacent macroblocks are not. Hence, if a particular macroblock is lost, the probability that a horizontally adjacent neighbor will also be lost will be much higher than the probability that a vertically adjacent macroblock will also be lost. In this instance the motion vectors representing respective macroblocks are coded within their vertically adjacent macroblocks. This is illustrated pictorially in the expanded portion of the "FRAME i" in FIG. 1. Thus if a particular macroblock is lost in transmission, there is a high probability that its associated motion vector will survive and may be utilized to aid in error concealment.

The motion vectors generated for I frames are applied to the formatter 25 for inclusion with the remaining macroblock data. However since motion vectors of slice n are included with macroblock data of the vertically adjacent slice n−1, the macroblock data of slice n−1 must be delayed one slice interval. This delay is provided by the compensating delay element 23. In FIG. 2, macroblock data is applied to the formatter 25 via a multiplexer 24 either directly from the run-length and variable encoder 22 or through the compensating delay 23. The multiplexer is conditioned to effect the direct connection during compression of P and B frames and to effect connection through the compensating delay during compression of I frames. Actually the compensating delay 23 and multiplexer 24 included in FIG. 2 are only symbolic. The formatter 25 marshalls significant amounts of data which arrives sporadically and thus requires storage memory to make respective types of data concurrently available for appropriate sequencing. To effect the one slice delay of the macroblock data to place the I frame motion vectors of slice n into macroblocks of slice n−1 merely requires increasing the size of such storage memory within the formatter 25.

Figure 3:
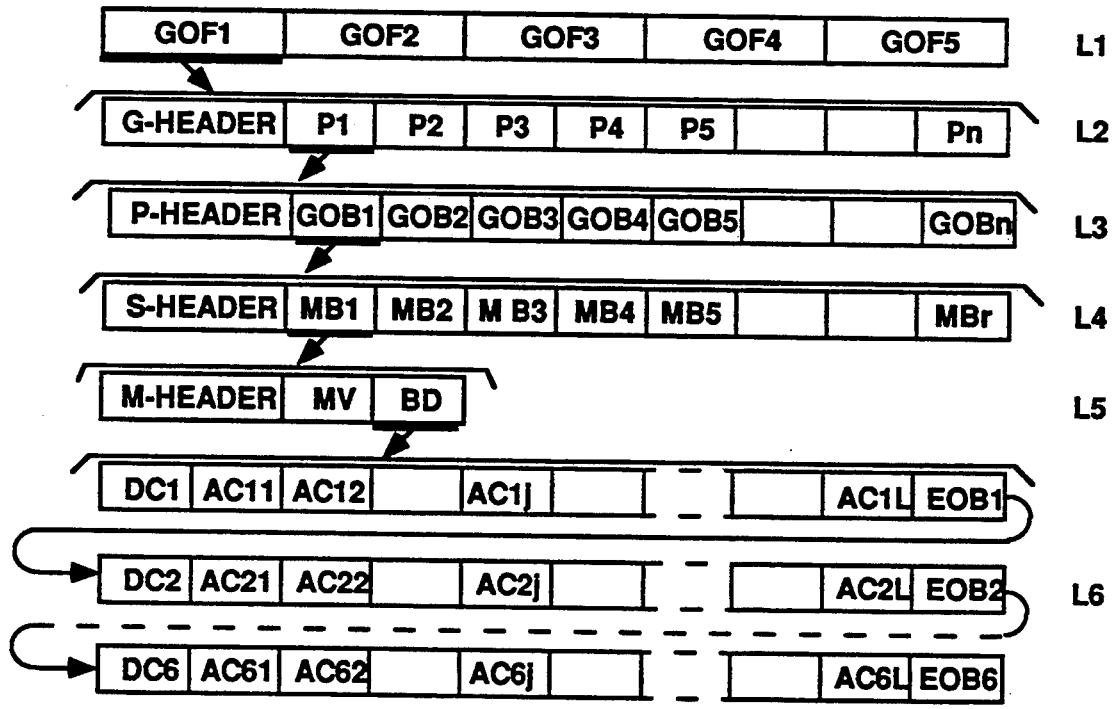
FIG. 3 is a pictorial representation of an MPEG-like compressed video signal code sequence.

The MPEG-like coded signal format is illustrated in FIG. 3. The MPEG hierarchical format includes a plurality of layers each with respective header information. Nominally each header includes a start code, data related to the respective layer and provision for adding header extensions. The header information is required for synchronization purposes in an MPEG systems environment.

The coded output signal of the present system is segmented in groups of fields/frames (GOF) illustrated by the row of boxes L2 (FIG. 3). Each GOF (L2) includes a header followed by segments of picture data. The GOF header includes data related to the horizontal and vertical picture size, the aspect ratio, the field/frame rate, the bit rate, etc.

The picture data (L3) corresponding to respective fields/frames includes a header followed by slice data (L4). The picture header includes a field/frame number and a picture code type. Each slice (L4) includes a header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Note each macroblock is comprised of 6 blocks, including four luminance blocks, one U chrominance block and one V chrominance block.

The block coefficients are provided one block at a time with the DCT, DC coefficient occurring first followed by respective DCT AC coefficients in the order of their relative importance. An end of block code EOB is appended at the end of each successively occurring block of data.

The compressed video data form the formatter 25 is applied to a transport processor 26 which a) segments the MPEG-like data into respective payload blocks b) extracts portions of the header information to form transport packet headers, c) concatenates the payload blocks and the transport packet headers to form intermediate transport packets, d) performs a parity or cyclic redundancy check on each intermediate transport packet and appends the appropriate parity check bits thereto to form respective transport packets, and c) may multiplex transport packets of associated auxiliary data with the transport packets of video data. The parity check bits are utilized by the receiver for isolating errors in conjunction with synchronizing header information and for providing error concealment in the event of uncorrectable bit errors in the received data.

Figure 4:
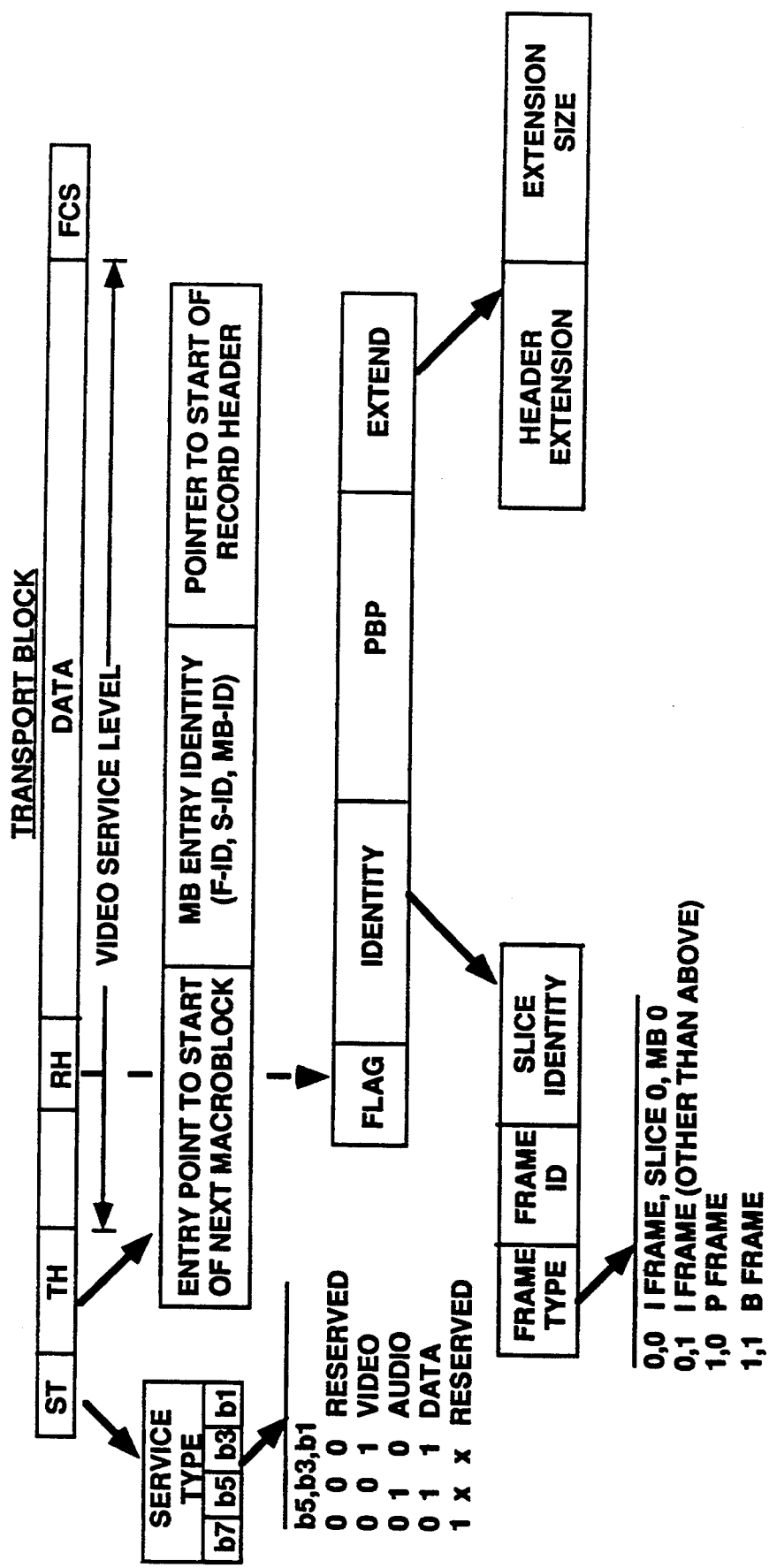
FIG. 4 is a pictorial representation of a transport packet utilized for transmitting MPEG-like data.
Figure 5:
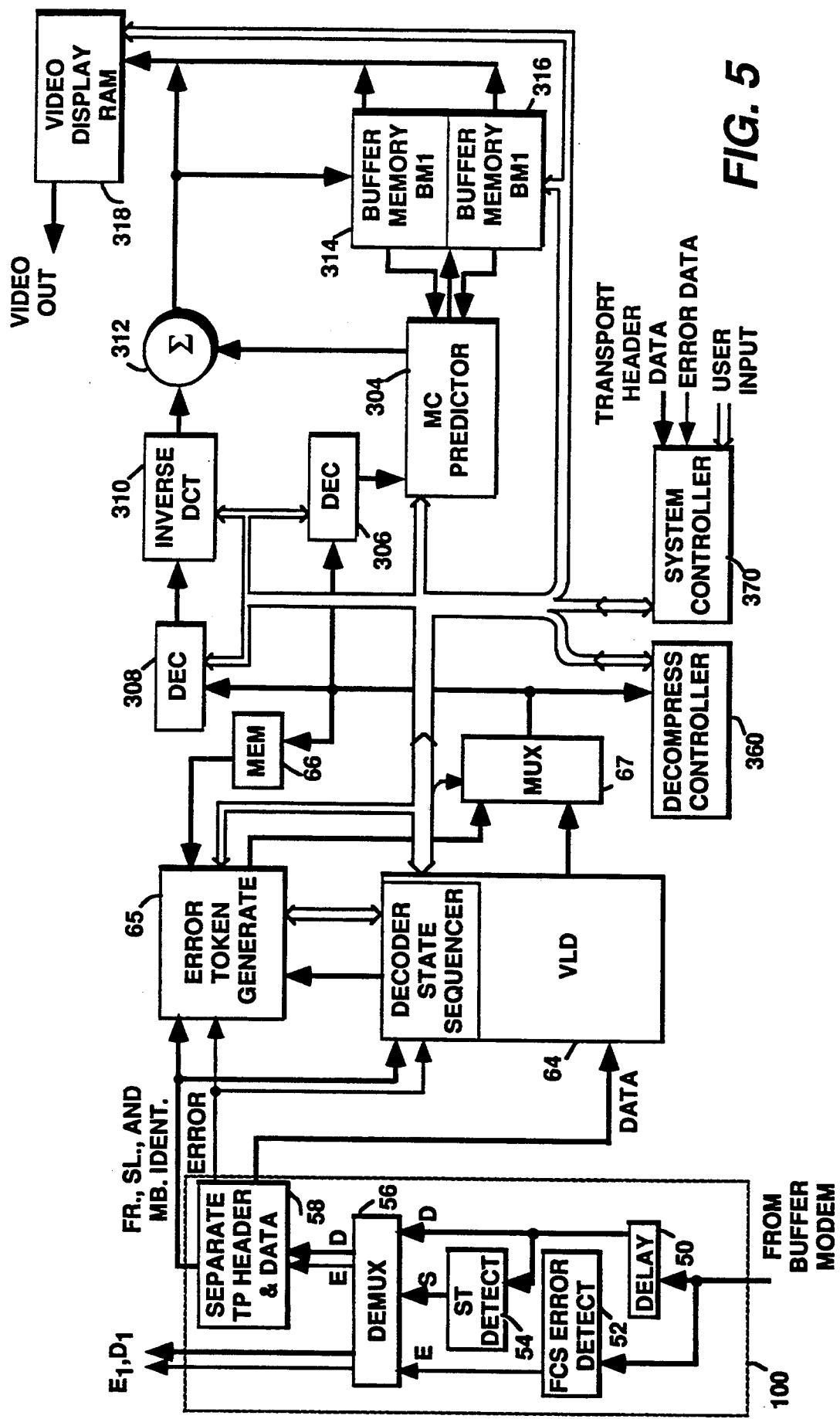
FIG. 5 is a block diagram of a portion of an MPEG-like signal decompressor including error concealment apparatus.

FIG. 4 illustrates the format of the signal provided by the transport processor. Respective transport packets may include more or less than a slice of data. Thus a particular transport packet may include data from the end of one slice and data from the beginning of the next subsequent slice. Transport packets including video data may be interleaved with transport packets containing other data, e.g., audio. Each transport packet includes a service type header ST which indicates the type of information included in the respective transport packet. In this example the ST header is an 8-bit word which indicates whether the data is high or standard priority, and whether the information is audio, video or auxiliary data.

Each transport packet includes a transport header TH immediately following the service header. The transport header includes a 7-bit macroblock pointer, an 18-bit identifier and a 7-bit record header (RH) pointer.

The macroblock pointer is used for segmented macroblock or record header components, and points to the start of the next decodable component. For example, if the particular transport packet includes macroblock data associated with the end of slice n and the beginning of slice n+1, the data from slice n is placed adjacent the transport header and the pointer indicates that the next decodable data is adjacent the transport header TH. Conversely, if a record header RH is adjacent the TH, the first pointer indicates the byte position following the record header RH. A zero valued macroblock pointer indicates that the transport packet has no macroblock entry point.

The transport packet may include none, one or more than one record header. A record header occurs at the beginning of each slice of macroblock data. No record headers are included in transport blocks that include only video data header information. The record header (RH) pointer points to the byte position containing the start of the first record header in the transport packet. A zero valued RH pointer indicates that there are no record headers in the transport packet. If both the record header pointer and the macroblock pointer are zero valued, this state indicates that the transport packet includes only video data header information.

The 18-bit identifier in the LP transport header identifies the current frame type, the frame number (modulo 32), the current slice number, and the first macroblock contained in the transport packet.

Following the transport header is either a record header, RH, or data. As indicated in FIG. 4 the record header for the video data includes the following information: A 1-bit FLAG which indicates if a header extension, EXTEND, is present. Following the FLAG is an identifier IDENTITY, which indicates a) the field/frame type I, B or P; b) a field/frame number (modulo 32) FRAME ID; and c) a slice number (modulo 64) SLICE IDENTITY. Following the identifier the record header includes a macroblock priority break point indicator, PBP. The PBP indicates the codeword class, developed by the analyzer 152 of the priority selector, for dividing the codewords between high and standard priority channels (when used). Lastly, an optional header extension may be included in the HP record header.

Each transport packet is terminated with a 16-bit frame check sequence, FCS, which is calculated over all bits in the transport packet. The FCS may be generated using a cyclic redundancy code.

A more detailed description of exemplary transport processing apparatus may be found in U.S. Pat. No. 5,122,875.

The transport packets of information are applied to a forward error encoding elements which a) perform REED SOLOMON forward error correction encoding; b) interleave blocks of data to preclude large error bursts from corrupting a large contiguous area of a reproduced image; and c) appends, e.g., Barker codes to the data for synchronizing the data stream at the receiver.

At a receiver the transmitted or stored compressed signal is detected, passed through a REED SOLOMON error corrector and applied via a rate buffer to a receiver transport processor 100. The data is applied to a one packet delay element 50 and to an error detector 52. The error detector is responsive to the FCS error code within respective transport packets to determine whether any errors survived the REED SOLOMON error correction, and if so to generate an error indication E which is coupled to one input of a demultiplexer 56. The delay element compensates for the time required to perform this error check. The delayed transport packet is applied to a second input of the demultiplexer 56 and to a service detector 54. The service detector examines the service code in the transport header to determine whether the transport packet is of the type to be serviced by the respective receiver, and if so what type of data the payload contains. Responsive to the service information the service detector generates a service control signal S to condition the demultiplexer to route the data and error signal to the appropriate decoder e.g., audio (not shown), video, etc.

The video data provided by the demultiplexer 56 is applied to an element 58 which is responsive to the error signal to excise transport packets containing errors that were not corrected by the REED SOLOMON error correction. Transport packets which contain no errors are separated into transport header data and the transport packet payload. The payload (DATA) is coupled to a variable length decoder VLD 64. The transport header data is arranged for utilization by an error token generator 65, the system controller 370 and/or VLD 64. For the most part, the MPEG-like data is variable length encoded and thus a variable length decoder is required to decode the video data. Variable length decoders are well known and are essentially state machines which route variable length codewords to different ones of a plurality of decoding tables. The particular table used for a particular codeword is dependent upon the type of data the codeword represents. Nominally, in an error free environment, a VLD will obtain all necessary data to perform decoding from the input data stream. However when segments of data are lost, such a VLD may lock up or take an inordinate time to resynchronize. The transport header data is applied to the VLD 64 along with the error signal, such that the VLD state machine is reset to the appropriate decoding state on the resumption of good data. Alternatively, after loss of data the state of the VLD may be re-established by control signals from the system controller 370 in response to transport header and error data.

In an error free environment, variable length decoded signal from the VLD are applied to the system controller and decompression controller 360 which extract the MPEG-like header data to control the overall decoding sequencing. The variable length decoded codewords corresponding to DCT coefficients are extracted and applied to a decoder 308 and the variable length decoded codewords corresponding to motion vectors are applied to the decoder 306. The decoder 308 contains apparatus for performing inverse run length decoding and inverse DPCM coding as appropriate under the control of the controller 360. Decoded data from the decoder 308 are applied to an inverse DCT circuit 310 which includes circuitry to inverse quantize the respective DCT coefficients and to convert the coefficients to a matrix of pixel data. The pixel data is then coupled to one input of an adder 312, the output of which is coupled to the video display RAM 318 and buffer memories 314 and 316.

The decoder 306 includes circuitry to perform inverse DPCM coding of the motion vectors as appropriate under the control of the controller 360. Decoded motion vectors are applied to a motion compensated predictor 304. Responsive to the motion vectors the predictor accesses corresponding blocks of pixels stored in one (forward) or both (forward and backward) of the buffer memories 314 and 316. The predictor provides a block of data (from the one of the buffer memories) or an interpolated block of data (derived from respective blocks from both buffer memories) to a second input of the adder 312.

Decompression is performed as follows. If a field/frame of input video data is intraframe encoded the motion vectors associated with respective macroblocks are stored in the memory 66 for use by the error token generator 65, and the decoded or inverse transformed DCT coefficients which correspond to blocks of pixel values are applied to the inverse DCT element 310 via the decoder 308. For intraframe encoded data the predictor 304 applies a zero value to the adder 312 and the inverse transformed DCT coefficients are passed unaltered by the adder 312, to the video display RAM where they are stored for readout according to normal raster scanning. The decoded pixel values are also stored in one of the buffer memories 314 and 316 for use in forming predicted image values for decoding motion compensated frames (B or P).

If a field/frame of input data corresponds to a forward motion compensated P field/frame, the inverse transformed coefficients correspond to residues or differences between the present field/frame and the lastmost occurring I frame. The predictor 304, responsive to the decoded motion vectors accesses the corresponding block of I frame data stored in either buffer memory 314 or 316 and provides this block of data to the adder wherein respective blocks of residues provided by the inverse DCT circuit 310 are added to the corresponding block of pixel data provided by the predictor 304. The sums generated by the adder 312 correspond to the pixel values for the respective blocks of the P field/frame, which pixel values are applied to the display RAM 318 to update respective storage locations. In addition the pixel values provided by the adder 312 are stored in the one of buffer memories 314 and 316 not storing the I field/frame of pixel data utilized to generate the predicted pixel data.

For bidirectionally encoded (B) field/frames the operation is similar, except predicted values are accessed from the stored anchor frames (I or P) in both buffer memories 314 and 316 depending upon whether the respective motion vectors are forward or backward vectors or both. The generated B field/frame pixel values are applied to update the display RAM 318, but are not stored in either of the buffer memories, as B field/frame data is not utilized for generating other field/frames of picture data.

The MPEG-like signal format allows the encoding of some macroblocks to be skipped. For macroblocks that are skipped, the decoder effectively copies them from the previous picture into the present picture, or alternatively, for skipped macroblocks the corresponding areas of the video display RAM 318 simply are not updated. Macroblock skipping may be accomplished by coding the motion vectors with zero values and the DCT coefficients with all zero values. This feature of the decoder may be utilized to effect error concealment for lost macroblocks, simply by synthesizing the appropriate compressed codewords for skipped macroblocks on the occurrence of lost macroblocks.

Next, let us consider an environment in which errors occur and transport packets are excised from the data stream applied to the VLD. Error concealment is the responsibility of the error token generator 65. The error token generator is, for example, a microprocessor which is programmed to respond to the header information included in the transport blocks, the state of the VLD and to the error indications. The error token generator 65 may include a table of substitute data which simulates compressed video data. This data corresponds to particular data that is recognizable by the MPEG-like decompressor. The error token generator is also provided with data from the memory 66 which may be substituted for excised video data. In particular, the memory 66, responsive to the state sequencer of the VLD, is loaded with motion vectors corresponding to, for example, the motion vectors of macroblocks in the previous slice of data.

The motion of image objects will occur across macroblock boundaries. In addition errors will propagate or occur along the horizontal direction. Thus it is likely that motion vectors for P and B encoded frames from vertically adjacent macroblocks will be similar, and the substitution of motion vectors from vertically adjacent macroblocks will result in acceptable error concealment. The motion vectors from vertically adjacent macroblocks of I encoded frames are precisely the requisite motion vectors to use in securing substitute data for lost I frame macroblocks. Similarly the DC DCT coefficients from vertically adjacent blocks can be expected to be similar. As such they may also be stored in the memory 66 for substitution of lost DC coefficients.

Storage of data in the memory 66 is controlled by the state sequencer within the VLD. The sequencer is programmed to condition the VLD to output data according to a predetermined sequence, and thus can provide the appropriate signals to fetch the desired types of data when it is output from the VLD. This data may be written into the memory at predetermined address locations which may be accessed by the error token generator.

The error token generator monitors the transport header data and the error signal to determine when and what data is lost, and responsive to lost data, substitutes data on a macroblock basis. Sequences of predetermined types of data are preprogrammed for substitution depending on the frame type and the type of data that is lost. For example, macroblocks carry particular addresses and occur in a predetermined sequence. The error token generator, responsive to the header data determines if there is a break in the normal sequence of macroblocks and provides substitute macroblocks for missing macroblocks. The substitute data may be in the form of synthesized compressed data, in which case it is substituted into the compressed data stream by the multiplexer 67 in place of the lost macroblock, or the substitute data may be in the form of, for example spatially collocated temporally delayed image data, in which case it is provided by simple management of the display RAM.

Examples of substitution data provided by the error token generator will now be considered. The type of substitution data is dependent upon the type of frame currently being processed and where in the data stream the error occurred. The simplest form of substitute data may consist simply of data indicating that a particular macroblock was not coded. This data is substituted in compressed form with the result that the decompression algorithm will replace the corresponding image area with collocated data from the previous frame. In actuality the decompression process simply does not update the corresponding image area in the display RAM 318.

Alternatively substitute data may comprise the macroblock address, the macroblock type, DC DCT coefficients corresponding to a midgray value for respective blocks in the macroblocks and EOB codes for respective blocks in the macroblock. In this instance the corresponding image area will be reproduced with a midgray brightness value.

Availability of motion vectors in the P and B frames provides added flexibility. Substitute macroblocks in compressed form may be composed of motion vectors stored in the memory 66 and selected from vertically adjacent macroblocks, and an indication that the current macroblock was not coded, which means that all of the residue values are considered to be zero valued. In this instance the area of the image corresponding to the lost macroblock will likely be moving in synchronism with the remainder of the image, however the actual picture detail of this area may be slightly in error.

Consider that the DC DCT coefficients of respective blocks may be differentially encoded (DCPM) from macroblock to macroblock. In this case the last macroblock of a sequence of substitute macroblocks will not have a correct DC DCT value for the first non substituted macroblock to reference. The error token generator may include facility to substitute a DC DCT coefficient in such last substitute macroblocks from a vertically adjacent macroblock (i.e., taken from memory 66) or from a temporally displaced collocated macroblock (taken from an expanded memory 66 arranged to store select compressed data for e.g. an entire frame).

Providing substitute data for I frames may be done in similar fashion, however since I frames are anchors for an entire group of frames, substitute data should be in compressed form so that the results are reflected in the prediction data stored in the memories 314, 316. Also note that compressed I frame data comprises pixel value DCT coefficients, not residue coefficients, and in normal operation, when I frame data is being decoded, the motion compensated predictor is nominally conditioned to provides a zero value to the adder 312. Thus if a substitute I frame macroblock is formed of a motion vector and zero valued coefficients, without more, the inverse DCT element 310 and the predictor 304 both will provide zero values to the adder 312 for the substitute macroblock with the result that the reproduced image area will be black. This problem is overcome by overriding the normal decompression algorithm via the control bus interconnecting the error token generator with the predictor. On the substitution of an I frame macroblock with a synthesized macroblock including compressed vertically adjacent motion vectors and zero valued coefficients or EOB code, the inverse DCT element will pass zero values but the predictor 304 is conditioned by the error token generator to pass the predicted image values selected by the motion vectors. These values will pass through the adder 312 to the display RAM and to the corresponding macroblock area in the appropriate buffer memory 314, or 316. The reproduced substitute image area may not be exactly correct since residues were not included to provide correction to the prediction values, however for most images of low to moderate detail the results will be substantially exact and in general conformity with local motion.

Further adjuncts to error concealment may be provided by the error token generator as desired. For a review of some of these adjuncts the reader is invited to consult U.S. patent application Ser. No. 08/017,455.

What is claimed is:

1. Apparatus for compressing video data comprising:
 a source of video signal to be compressed;
 motion compensated predictive compression means for compressing respective frames of said video signal according to either intraframe processing or interframe processing and on a block by block basis to generate blocks of compressed data corresponding to respective image areas, said motion compensated predictive compression means including means for providing interframe motion vectors $MV_i$ for blocks $B_i$ of both intraframe and interframe processed video signal, said motion vectors $MV_i$ relating respective blocks of predicted video signal to blocks of original video signal which are substantially similar; and
 formatting means for arranging said blocks of compressed data and associated said motion vectors according to a desired signal protocol, wherein said interframe motion vectors $MV_i$ for blocks $B_i$ of said interframe processed video signal are attached to blocks $B_i$ of interframe compressed data to which they relate and said interframe motion vectors $MV_i$ for blocks $B_i$ of said intraframe processed video signal are attached to blocks $B_k$ of intraframe compressed data different than blocks $B_i$ of intraframe compressed data to which the respective interframe motion vectors relate, where index k is not equal to index i.

2. The apparatus set forth in claim 1 wherein said motion vectors corresponding to respective said intraframe processed blocks are attached to vertically adjacent blocks of compressed data.

3. The apparatus set forth in claim 1 wherein said motion compensated compression means includes means for providing blocks of transformed pixel values for said intraframe processed video signal and for providing blocks of transformed residues for said interframe processed video signal, wherein said residues correspond to respective differences between predicted pixel values and original pixel values.

4. Apparatus for processing motion compensated compressed video data wherein ones of frames of video signal are compressed according to intraframe processing and other frames of said video signal are compressed according to interframe processing, and wherein said intraframe and interframe processing generates compressed data on a block by block basis, and wherein motion vectors are generated for respective blocks of intraframe processed data, and respective motion vectors of intraframe processed blocks are attached to blocks of data other than blocks to which they respectively correspond, said apparatus comprising:
 a source of said motion compensated compressed video data;
 means for detecting errors in said motion compensated compressed video data and for discarding blocks of data including errors;
 means for separating said motion vectors from respective blocks of intraframe compressed data, and for storing said motion vectors in memory, and for applying blocks of intraframe compressed data without corresponding intraframe motion vectors to decompression means for decompression;
 means, responsive to said motion compensated compressed video data and said means for detecting errors, for providing blocks of synthesized data for said blocks of intraframe compressed data discarded by said means for detecting errors, said synthesized data formed using intraframe motion vectors corresponding to said discarded blocks, which said motion vectors are accessed from said memory; and
 means for substituting said blocks of synthesized data for corresponding said discarded blocks of intraframe compressed data.

5. The apparatus set forth in claim 4 wherein said decompression means includes:
 inverse transform means having an input port coupled to receive said blocks of compressed data, and having an output port for providing blocks of inverse transformed data;
 an adder having a first input port coupled to the output port of said inverse transform means, having an output port at which decompressed signal is available and having a second input port;
 a motion compensated predictive decompressor coupled to the output port of said adder and responsive to said decompressed signal and said motion vectors for generating at an output port of said motion compensated predictive decompressor, blocks of data corresponding to predicted frames of said video signal; and
 means for coupling the output of said motion compensated predictive decompressor to the second input port of said adder when said interframe processed data is being decompressed, and for normally applying a zero value to the second input port of said adder when said intraframe processed data is being decompressed, and for concurrently coupling said motion compensated predictive decompressor to the second input port of said adder and applying a zero value to the first input port of said adder to provide decompressed data for discarded blocks of intraframe data.

6. Apparatus for processing motion compensated compressed video data wherein ones of frames of video signal are compressed according to intraframe processing and other frames of said video signal are compressed according to interframe processing, and wherein said intraframe and interframe processing generates compressed data on a block by block basis, and wherein motion vectors, $MV_{intraframe}$, are generated for respective blocks of intraframe processed data, and respective motion vectors, $MV_{intraframe}$, of intraframe processed blocks are attached to blocks of data other than blocks to which they respectively correspond, said apparatus comprising:
 a source of said motion compensated compressed video data;
 means for detecting errors in said motion compensated compressed video data and for discarding blocks of data including errors;
 means for separating motion vectors, $MV_{intraframe}$, from said respective blocks of intraframe compressed data, for storing said motion vectors, $MV_{intraframe}$, in memory, and for normally applying blocks of intraframe compressed data, without said motion vectors, $MV_{intraframe}$, to decompression means for decompression;
 means, responsive to said means for detecting errors, and stored motion vectors, $MV_{intraframe}$, in said memory, for generating substitute blocks of image data for discarded blocks of intraframe compressed data.

* * * * *